United States Patent [19]

Toft

[11] Patent Number: 4,890,201
[45] Date of Patent: Dec. 26, 1989

[54] LIGHT TRANSMITTING PLATE MEMBER

[75] Inventor: Nils Toft, Copenhagen, Denmark

[73] Assignee: Generaldirektoratet for Danske Statsbaner, DSB, and Jens Moller-Jensen, Copenhagen, Denmark

[21] Appl. No.: 288,129

[22] Filed: Dec. 22, 1988

[51] Int. Cl.$^4$ .............................................. F21V 7/04
[52] U.S. Cl. ..................................... 362/31; 362/330; 362/812; 40/546
[58] Field of Search .................. 362/31, 327, 328, 329, 362/330, 812; 40/544, 546, 547, 570

[56] References Cited

U.S. PATENT DOCUMENTS

| | | | |
|---|---|---|---|
| 2,247,969 | 7/1941 | Stewart | 362/31 |
| 4,059,916 | 11/1977 | Tachihara et al. | 362/31 X |
| 4,257,084 | 3/1981 | Reynolds | 362/31 |
| 4,432,039 | 2/1984 | Cibie | 362/31 |
| 4,642,736 | 2/1987 | Masuzawa et al. | 362/31 |
| 4,791,540 | 12/1988 | Dreyer, Jr. et al. | 362/31 X |

Primary Examiner—Stephen F. Husar
Assistant Examiner—Peggy Neils
Attorney, Agent, or Firm—Antonelli, Terry & Wands

[57] ABSTRACT

A light transmitting plate member for illuminated signals, illuminated tables or similar illuminated flat items and intended for uniform diffusion of light from a light source positioned at a side edge of the light transmitter which has a flat side and an opposing side which has a gradual slope. The plate member has a reduced thickness in the direction away from said side edge, with the opposite sides being produced with optically smooth surfaces as the light transmitting plate member includes transparent and light transparent material with specific optical properties. The side with the gradual slope is provided with a number of angled divisions which are defined by transverse divisional lines which run parallel to the side edge and which are positioned with either uniform intervals or with graded intervals which are reduced in the direction receeding from the side edge. The thickness of the light transmitting plate member at the transverse divisional lines corresponds to the thickness of the light transmitting plate member at the side edge, whose angled divisions from the divisional lines and in the direction away from the side edge have reduced thicknesses.

8 Claims, 3 Drawing Sheets

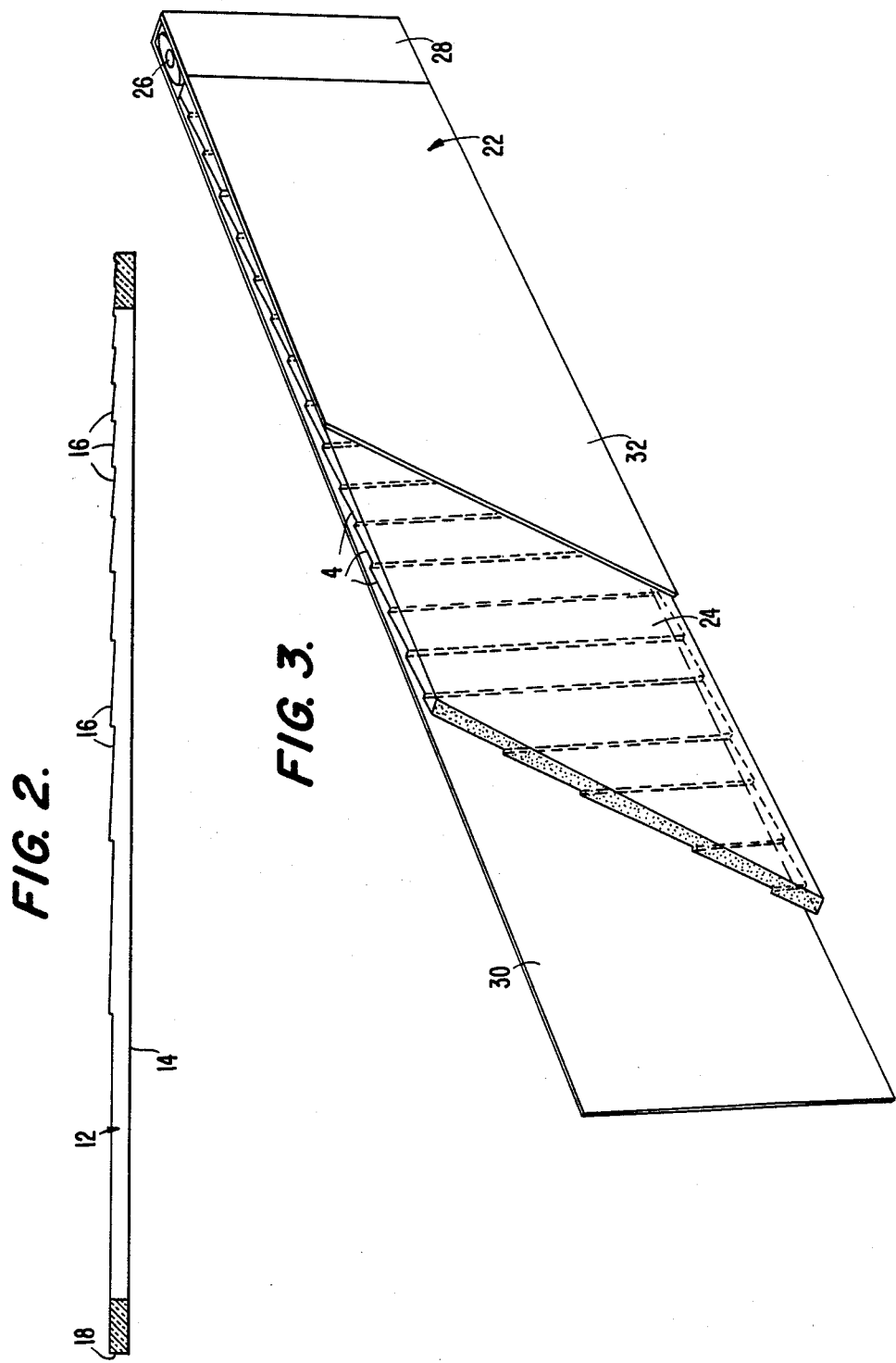

LIGHT TRANSMITTING PLATE MEMBER

BACKGROUND OF THE INVENTION

The present invention relates to a light transmitting plate member for illuminated signs, illuminated tables or similar illuminated flat items.

A light transmitting plate member 4 illuminated signs, illuminated tables or a similar illuminated flat item and adapted for uniform diffusion of light from a light source positioned at a side edge of the light transmitter which has a preferably flat side and an opposing side which has a gradual slope has been proposed wherein the plate member has a reduced thickness in a direction away from the first side edge, with opposite sides being provided with optically smooth surfaces as the light transmitting plate member includes transparent and light transparent material with specific optical properties.

A light transmitter or light source of the aforementioned type is described in, for example known from the description to Danish Patent Application 3800/84 and U.S. Pat. No. 3,464,133 relating to a display apparatus comprising a number of successively activated light sources, with the apparatus being adapted to animate a multi-dimensional picture when observed from the front side of a prismatic light transmitter being illuminated from a narrow side edge by one or more light sources.

These known devices and the light transmitting plate member according to the invention are based on the particular optical and/or light technical conditions in which a ray of light, introduced from a side edge of a prismatic member, is reflected from opposite surfaces of the member with a still reduced angle of refraction for each reflection is reduced with the cone angle of the prism, i.e. the angle of inclination between the opposite surfaces of the prism. By introducing not only a single ray of light but a pencil of rays of light under different angles of incidence into the light transmitter, a rather uniform diffusion of the reflected and finally transmitted rays of light from the light transmitter is obtained. As a matter of fact there is also applied a lower critical angle of refraction as well as an upper critical angle of refraction determined by the index of refraction for the actual material from which the light transmitting plate member is produced.

The invention has for its purpose to provide an improved light transmitting plate member of the aforementioned type by which, by simple measures, may be obtained a considerably better and uniform diffusion of light, with light transmitting plate members having a considerable length.

According to the invention the light transmitting plate member is characterized by the side with the gradual slope being provided with a number of angled divisions which are defined by transverse divisional lines which, in general, run parallel to the first side edge and which are positioned with either uniform intervals or with graded intervals which are reduced in the direction receeding from the first side edge. A height or the thickness of the light transmitting plate member at the transverse divisional lines, in general, corresponds to the thickness of the light transmitting plate member at the first side edge, whose angled divisions from the divisional lines and in the direction away from the first side edge have reduced thicknesses, i.e. are inclined in relation to a reference plane parallel to the first particular plane side of the light transmitting plate member. Hereby is obtained a quite new and improved type of light transmitting plate member which may be produced with a considerably less self-weight per unit of length and which is suitable for production by extruding, whereby also the costs of production may be minimized, of course on condition of a reasonably large production. Furthermore, the light transmitting plate member according to the invention shows a considerably increased efficiency as to uniform light diffusion ability, even with a rather considerable total length. By way of example the light transmitting plate member according to the invention may be produced from a rather cheap acrylic plate, e.g. having an initial thickness of about 10 mm and with a length of up to about 1400 mm and a width which nearly alone is determined by the width of the item which is to be illuminated, and of course, the actual used light source i.e. the length of, by way of example, a low voltage tube lamp (PL-lamp).

Preferably, the angles of inclination of the angled divisions of the opposite side and the mutual lengths between the divisional lines are varied in such a manner that each of the angled divisions or gradual slopes are illuminated approximately uniform by light diffusion from the the respective sides of the light transmitting plate member, of which the the first preferable plane side is considered as the front side of the light transmitting plate member which is preferably turned against the item which is to be illuminated e.g. a sign plate, while the opposite side of the light transmitting plate member with the gradual slopes is considered as the rear side of the light transmitting plate member whereby preferably a reflector is positioned being adapted to reflect the light right through the light transmitting plate member, i.e. out through the plane front side thereof.

Appropriately, the light transmitting plate member is produced from a preferably plane acrylic plate of minor thickness, e.g., 5–15 mm, preferably 10 mm and with a considerable length, e.g. 200–1400 mm, preferably about 1200 mm, as the angled divisions are varying from about 0.1°–5° nearest at the first side edge to about 5°–20° farthest of from the first side edge, in dependence upon the total length of the light transmitting plate member.

BRIEF DESCRIPTION OF THE DRAWINGS

In the following the invention is described in more details reference being made to the accompanying drawing, in which:

FIG. 2 is a side view, partly in section, of another embodiment of a light transmitting plate member according to the invention, FIG. 3 is a perspective view of an illuminated sign provided with a light transmitting plate member according to the invention.

DETAILED DESCRIPTION

Figure 1:
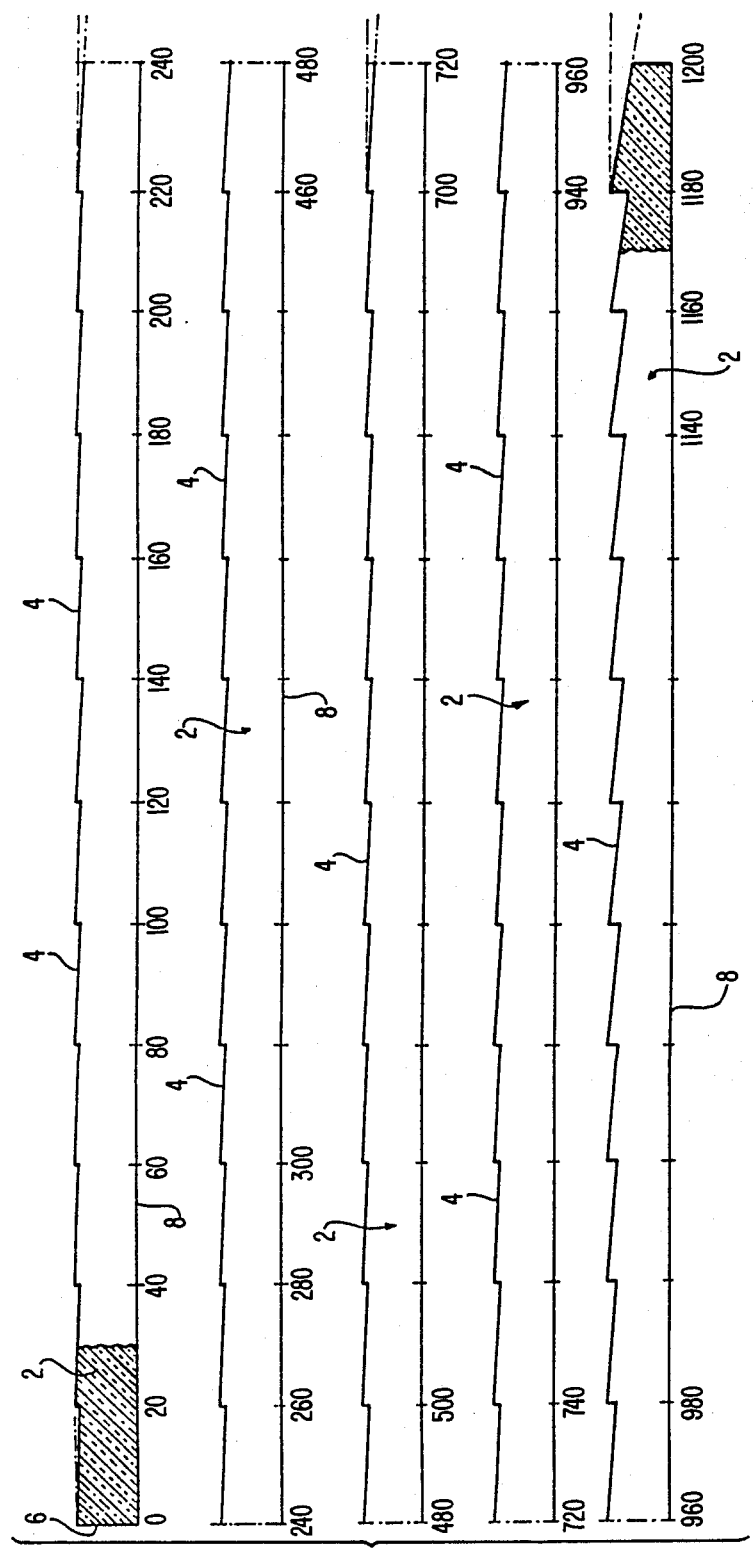
FIG. 1 is a side view, partly in section, of an embodiment of a light transmitting plate member according to the invention, shown almost in natural size in five parts.

The light transmitting plate member shown in FIG. 1 is produced from a transparent acrylic plate with an initial thickness of about 10 mm and with a plate geometry which is shown in the below TABLE 1, in which the lengths of the left column represent the longitudinal extent of angled divisions 4 of the light transmitting plate member 2 as the length of the angled divisions 4 are each 20 mm and all being measured from a left side edge 6 of the light transmitting plate member, i.e. that the measures shown along a plane front side 8 thereof are also to be found in the left column of TABLE 1. To save space the light transmitting plate member 2 of FIG. 1 is divided into 5 uniform pieces of each 240 mm. Also to save space TABLE 1 is shortened by omission of some partial sections of the plate geometry of the light transmitting plate member 2. The middle column of TABLE 1 shows the height or the thickness of the light transmitting plate member 2 at the respective crossings between said angled divisions 4, while the right column of TABLE 1 shows the respective inclination angles of the divisions in relation to a reference plane parallel to the plane front side 8, as the vertical intervals between the divisions 4 are indicated as 90° angles.

The plate geometry shown is calculated by computer as the length of each divisions 4 and the plate thickness at the crossings between the divisions 4 have been kept as predetermined constants on 20 and 10 mm, respectively. Besides, the method of calculation has aspired to uniform light diffusion in the light transmitting plate member 2 which by way of calculation has been supplied with pencils of light rays which have been introduced from the center of the left side edge 6 by angles of incidence from −42° to +42° as consideration has been taken to the lowermost angle of limitation of a little under 42° of the material in question, namely, an acrylic material.

TABLE 1

| (Plate geometry - FIG. 1) | | |
| --- | --- | --- |
| Length (mm) | Height (mm) | Angle (°) |
| 0.000 | 10.000 | −0.600 |
| 20.000 | 9.791 | 90.000 |
| 20.000 | 10.000 | −0.600 |
| 40.000 | 9.791 | 90.000 |
| 40.000 | 10.000 | −0.600 |
| 60.000 | 9.791 | 90.000 |
| . | . | . |
| 200.000 | 10.000 | −0.600 |
| 220.000 | 9.790 | 90.000 |
| 220.000 | 10.000 | −0.600 |
| 240.000 | 9.790 | 90.000 |
| . | . | . |
| 320.000 | 9.790 | 90.000 |
| 320.000 | 10.000 | −0.602 |
| 340.000 | 9.790 | 90.000 |
| 340.000 | 10.000 | −0.603 |
| 360.000 | 9.790 | 90.000 |
| 360.000 | 10.000 | −0.604 |
| 380.000 | 9.789 | 90.000 |
| . | . | . |
| 560.000 | 9.774 | 90.000 |
| 560.000 | 10.000 | −0.659 |
| 580.000 | 9.770 | 90.000 |
| 580.000 | 10.000 | −0.674 |
| . | . | . |
| 740.000 | 10.000 | −0.967 |
| 760.000 | 9.662 | 90.000 |
| 760.000 | 10.000 | −1.039 |
| 780.000 | 9.637 | 90.000 |
| 780.000 | 10.000 | −1,123 |
| . | . | . |
| 980.000 | 10.000 | −3.125 |
| 1000.000 | 8.908 | 90.000 |
| 1000.000 | 10.000 | −3.509 |
| . | . | . |
| 1180.000 | 10.000 | −10.000 |
| 1200.000 | 6.473 | 90.000 |

TABLE 1-continued

| (Plate geometry - FIG. 1) | | |
| --- | --- | --- |
| Length (mm) | Height (mm) | Angle (°) |
| 1200.000 | 0.000 | 0.000 |

The optical/light technical rules of calculation are described more fully in Danish Patent Application 3800/84, and U.S. Pat. Nos. 3,464,133 and 4,059,916, which rules of calculation hereby are included in the present description.

Another embodiment of a light transmitting plate member 12 according to the invention is shown in FIG. 2. This light transmitting plate member 12 is also produced from transparent acrylic material with a plane front side 14 and a rear side 16 which is provided with angled divisions 16, i.e., with a plate geometry, which in full is indicated in TABLE 2 hereinbelow, in which the middle column, like TABLE 1, indicates the actual height or thickness of the light transmitting plate member 12 at the respective crossings between the angled divisions 16, while the right column of TABLE 2 indicates the actual angles of inclination of the division 16 and the right-angled edged portions at the crossings between the angled divisions 16, respectively.

TABLE 2

| (Plate geometry - FIG. 2). | | |
| --- | --- | --- |
| Length (mm) | Height (mm) | Angle (°) |
| 0.000 | 10.000 | −0.500 |
| 171.883 | 8.500 | 90.000 |
| 171.883 | 10.000 | −1.000 |
| 257.818 | 8.500 | 90.000 |
| 257.818 | 10.000 | −1.500 |
| 315.100 | 8.500 | 90.000 |
| 315.100 | 10.000 | −2.000 |
| 358.055 | 8.500 | 90.000 |
| 358.055 | 10.000 | −2.500 |
| 392.410 | 8.500 | 90.000 |
| 392.410 | 10.000 | −3.000 |
| 421.032 | 8.500 | 90.000 |
| 421.032 | 10.000 | −3.500 |
| 445.557 | 8.500 | 90.000 |
| 445.557 | 10.000 | −4.000 |
| 467.008 | 8.500 | 90.000 |
| 467.008 | 10.000 | −4.500 |
| 486.067 | 8.500 | 90.000 |
| 486.067 | 10.000 | −5.000 |
| 503.212 | 8.500 | 90.000 |
| 503.212 | 10.000 | −5.500 |
| 518.790 | 8.500 | 90.000 |
| . | . | . |
| 546.227 | 10.000 | −7.000 |
| 550.000 | 9.537 | 90.000 |
| 550.000 | 0.000 | 0.000 |

In this case the plate geometry is also calculated by a computer, with an assumption being constant values of the heights or the plate thickness at the crossings between the divisions 16 and predetermined angle intervals of the angles of inclination of the angled divisions 16, that is, an initial angle on −0.5° adjacent to the left side edge 18 of the light transmitting plate member 12 to a final angle of −7.0° farthest away from the side edge 18. On the assumption that the light transmitting plate member 12 should give an approximate uniform light diffusion summed up along opposite side surfaces thereof the respective lengths of the divisions 16 are then calculated as indicated in the left column of TABLE 2 and in FIG. 2, respectively. Also in this case the light-technical assumptions have been that light is introduced into the light tranmitter 12 along a center line of the side edge 18 with angle limitations from "42° to +42°. The light transmitting plate member 12 is as the case of the light transmitting plate member 2 shown in FIG. 1 produced from a transparent acrylic plate with an initial plate thickness of 10 mm and a total length of about 550 mm.

Figure 4:
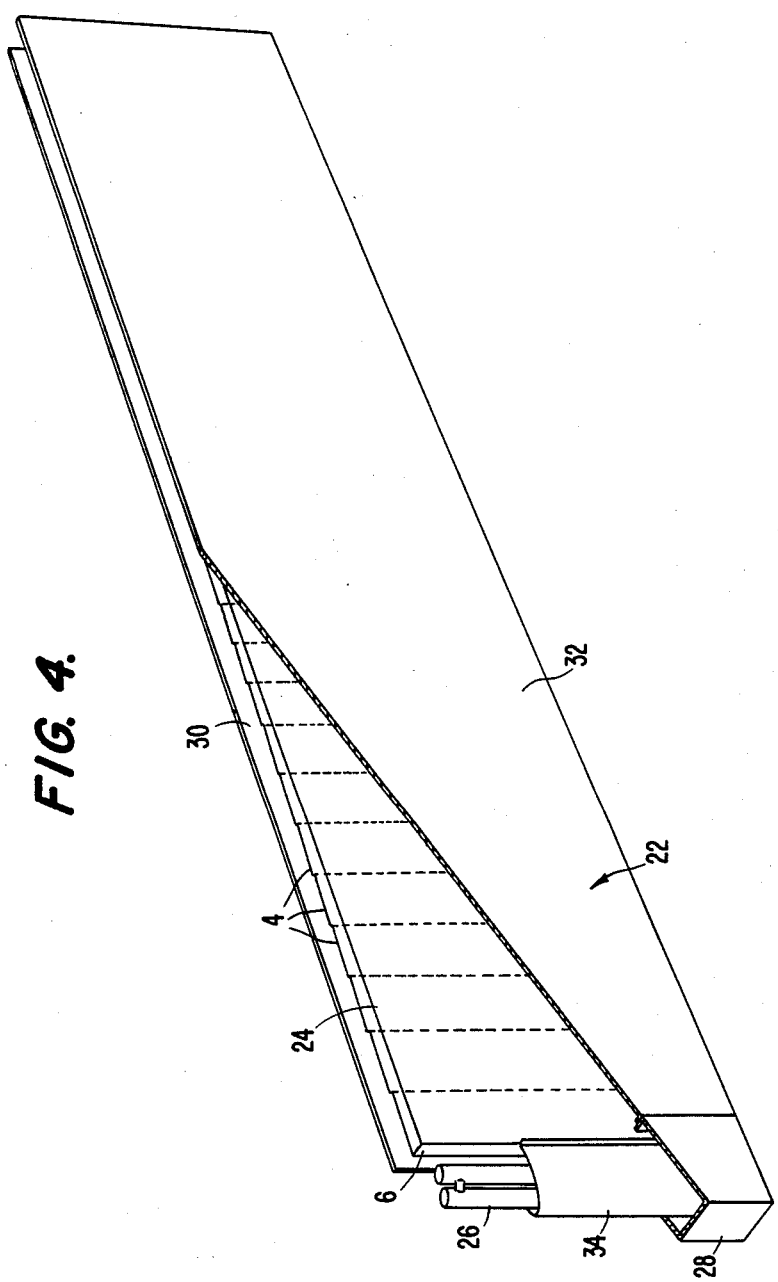
FIG. 4 is a perspective view of the illuminated sign shown in FIG. 3 as viewed from the opposite side.

The illuminated sign 22 shown in FIGS. 3 and 4 is provided with a light transmitting plate member 24 of the same type as the light transmitting plate member 2 of FIG. 1 and TABLE 1, i.e. with uniform longitudinal extension of the angled divisions 4 and with increasing angles of inclination seen in the direction receeding from the side edge 6, whereby a light source in the form of a tubular lamp 26 is placed in a lamp housing 28 into which is inserted the side edge 6 of the light transmitting plate member 2. The lamp housing 28 and the illuminated sign 22 as a whole is surrounded by a light tight edge frame (not shown) in which furthermore a rearmost reflector plate member 30, the light transmitter 2 and a front sign plate member 32 are mounted. Preferably the sign plate member 32 consists of an opalescent glass plate or a white transparent acrylic plate on which the actual sign text or other sign decoration is directly printed.

As shown in FIG. 4 the tubular lamp 26 of the illuminated sign 22 is surrounded by a reflector shade 34 being tightly connected to the side edge 6 of the light transmitter 2. The tubular lamp 26 used may be a low voltage lamp, e.g. 9 W, PL-lamp, which has shown to be satisfactory to illuminate a sign plate of 200×1200 mm in an approximately quite uniform manner.

A further and alternative plate geometry of the light transmitting plate member appears from TABLE 3 below, where the assumptions for the calculation have been the number, that is, ten angled divisions and constant values of the heights or the plate thickness at the crossings between the respective angled divisions. These heights are, for example the middle column constant, that is, 8 and 10 mm, respectively. On the other hand TABLE 3 also shows varying angles of inclination of the angled divisions as varying longitudinal extension of the angled divisions which as earlier all are measured from the side edge where the light source is adapted to be placed. The light-technical assumptions have been the same as in TABLES 1 and 2.

TABLE 3

| (Plate geometry - alternative). | | |
| --- | --- | --- |
| Length (mm) | Height (mm) | Angle (°) |
| 0.000 | 10.000 | −0.500 |
| 229.177 | 8.000 | 90.000 |
| 229.177 | 10.000 | −0.690 |
| 395.244 | 8.000 | 90.000 |
| 395.244 | 10.000 | −0.880 |
| 525.451 | 8.000 | 90.000 |
| 525.451 | 10.000 | −1.070 |
| 802.476 | 8.000 | 90.000 |
| 802.476 | 10.000 | −1.640 |
| 872.330 | 8.000 | 90.000 |
| 872.330 | 10.000 | −1.830 |
| 991.632 | 10.000 | −2.210 |
| 1000.000 | 9.677 | 90.000 |
| 1000.000 | 0.000 | 0.000 |

In order to illustrate the efficiency of the light transmitting plate member according to the invention, reference is made to the TABLE 4 hereinbelow which indicates the light diffusion in % for an alternative light transmitting plate member with a total length of 1200 mm, a plate thickness of 10 mm, forty sloped surfaces, each with a length of 30 mm, an initial angle of −0.450% and a final angle of −10.000°, i.e., a light transmitting plate member of the same type as shown in FIG. 1 and TABLE 1, respectively.

TABLE 4

| (Light diffusion - %). | | |
| --- | --- | --- |
| Front side | Rear side | Total |
| 0.00 | 0.00 | 0.00 |
| 5.60 | 5.35 | 10.95 |
| 5.75 | 5.20 | 10.95 |
| 5.15 | 5.65 | 10.80 |
| 5.90 | 5.30 | 11.20 |
| 5.70 | 5.15 | 10.85 |
| 5.45 | 5.60 | 11.05 |
| 4.75 | 6.00 | 10.75 |
| 5.35 | 5.65 | 11.00 |
| 5.40 | 5.65 | 11.05 |
| 49.05 | 49.55 | 98.60 |

Light radiation, nearest side edge: 0.00%
Light radiation, farthest side edge: 1.40%

TABLE 4 indicates the light diffusion, i.e. the amount of light radiated from divisions of 120 mm (corresponding to 4 angled divisions of each 30 mm) of as well the plane front side as the "saw-tooth-scaped" rear side. In right column is indicated the total amount of light from the respective divisions as it is assumed that all light radiates through the plane front side to the sign plate, because a reflector plate member is placed at the rear side of the light transmitting plate member. In TABLE 4, no light at all radiates from the respective surfaces of the first division of the light transmitter, because this, in the example of calculation, has been effectively screened to both sides. TABLE 4 indicates the efficiency of the light transmitting plate member as to very uniform diffusion of light which is introduced from the front side edge. Almost all the light is exploited effectively as only 1.4% of the radiation of light has not to be screened at the rearmost side edge if this light has not to be exploited also, e.g. by a double sign system. Such a double sign system by way of example may comprise two light transmitting plate members illuminated by lamps from opposite ends so that farthest side edge of both light transmitting plate members may be directly interconnected, whereby also the light radiation from both "farthest" side edges may be effectively exploited. By means of the light transmitting plate member according to the invention in this manner an illuminated sign may have a total length of more than 2000 mm. without the sign needing to be correspondingly extra thick and extra heavy to handle.

A further alternative embodiment of the light transmitting plate member according to the invention may consist in that the light transmitter adjacent to the light source, i.e. at the first division, has an extra strongly graduated slope after which the succeeding divisions again have very little graduated slope with successively increasing angles of inclination in the direction receeding from the light source. Such alternative embodiment of the light transmitter according to the invention may advantageously be used in particular cases where one due to certain reasons is forced to use a light source of less efficiency. In such a case it may even be actual to use a light transmitter with increased thickness, e.g. the double thickness, at the front side edge, while the light transmitter already after first division again is of "normal" thickness. For very short and narrow illuminated signs may be used a light transmitting plate member cfr.

the invention with a very little initial thickness, e.g. on 5 mm or even less.

For the executed tests have been used light transmitting plate members according to the invention which were produced from plane acrylic plates by milling and succeeding polishing. However, it is expected that the light transmitting plate member according to the invention in the coming production should be produced by rolling of plane acrylic plates or in a material with corresponding light-technical qualities.

Furthermore, as has been mentioned, to produce the light transmitting plate member according to the invention by extrusion would presumeably be especially advantageous for smaller light transmitting plate members. Of course the light transmitting plate member according to the invention may also be produced by casting which by the way is a method which is very often used when producing plate-scaped items from acrylic or similar materials.

Preferably, the light transmitting plate member according to the invention consists of transparent acrylic material, but of course nothing would prevent production of the light transmitting plate member as described from transparent, colored artificial resin, such as an acrylic resin.

The introduction of light into the front side edge of the light transmitter may according to a method known per see be improved by providing the side edge with a gradual slope in relation to the plane front side of the light transmitting plate member, or the side edge thereof may be provided with a very weak curve, i.e. concave, whereby the introduction of rays of light may be more effective. If the foremost side edge portion of the light transmitter is inserted somehow into the lamp housing, it would furthermore be possible to improve the transmission of light through the light transmitting plate member by applying one or both opposite side surfaces thereof with a silvering which of course may not extend outside the lamp housing.

Instead of illuminating the light transmitting plate member directly by a lamp there may be used more separate light transmitters which are inserted into suitable holes in the foremost side edge and which are supplied with light from a quite separate special lamp which could even be common for more separate light transmitting plate members.

I claim:

1. A light transmitting plate member for illuminated signs, illuminated tables or a similar illuminated flat item and adapted for uniform diffusion of light from a light source position at a first side edge of a light transmitter having a substantially flat surface and an opposing surface having a gradual slope, the plate member having a reduced thickness in a direction away from said first side edge, said opposing surface including optically smooth surfaces including at least one of transparent and light transparent material with specific optical properties, wherein said opposing surface is provided with a plurality of angled divisions defined by transverse divisional lines extending parallel to said first side edge and positioned at one of uniform intervals or graded intervals which are reduced in the direction away from said first side edge, a height or a thickness of the light transmitting plate member at the transverse divisional lines is substantially equal to a thickness of the light transmitting plate member at said first side edge, and wherein angles of inclination subtended between the respective divisional lines and a plane extending parallel to said flat surface and in the direction away from said first side edge have a reducing thickness.

2. A light transmitting plate member according to claim 1, wherein the angles of inclination are varied in such a manner that portions of the transmitting plate member between adjacent divisional lines are illuminated aproximately uniform by light diffusion from the first side edge and an opposite side edge of the light transmitting plate member.

3. A light transmitting plate member according to one of claims 1 or 2, wherein the light transmitting plate member has a thickness of between 5–15 mm, a length of about 200–1400 mm, and said angles of inclination have a range of about 0.1°–5° nearest said first side edge to about 5°–20° farthest from said first side edge in dependence upon a total length of the light transmitting plate member.

4. A light transmitting plate member according to claim 3, wherein said flat surface is adapted to be disposed facing an item to be illuminated, and wherein a reflector means is positioned adjacent said opposing surface for reflecting light directly through the light transmitting plate member toward the flat surface thereof.

5. A light transmitting plate member according to claim 4, wherein the light transmitting plate member has a thickness of about 10 mm.

6. A light transmitting plate member according to claim 5, wherein the light transmitting plate member has a length of about 1200 mm.

7. A light transmitting member according to claim 6, wherein the item to be illuminated is a sign plate.

8. A light transmitting plate member according to claim 6, wherein the plate member is made of an acrylic material.

* * * * *